(12) United States Patent
Kass et al.

(10) Patent No.: US 8,571,526 B2
(45) Date of Patent: Oct. 29, 2013

(54) SYSTEM AND METHOD FOR RECORDING A COMMUNICATION

(75) Inventors: Sheldon Kass, North Brunswick, NJ (US); Michael James Langford, Atlanta, GA (US)

(73) Assignee: Just Calling, LLC, Cranbury, NJ (US)

( * ) Notice: Subject to any disclaimer, the term of this patent is extended or adjusted under 35 U.S.C. 154(b) by 0 days.

(21) Appl. No.: 12/683,905

(22) Filed: Jan. 7, 2010

(65) Prior Publication Data

US 2010/0173618 A1 Jul. 8, 2010

Related U.S. Application Data

(60) Provisional application No. 61/204,479, filed on Jan. 7, 2009.

(51) Int. Cl.
*H04M 3/42* (2006.01)

(52) U.S. Cl.
USPC .................................. 455/414.1; 379/201.01

(58) Field of Classification Search
USPC .......... 455/412.1, 456.2, 456.3, 456.1, 414.1; 379/85, 88.24, 201.01, 414.1
See application file for complete search history.

(56) References Cited

U.S. PATENT DOCUMENTS

| | | | | |
|---|---|---|---|---|
| 6,668,044 | B1* | 12/2003 | Schwartz et al. | 379/68 |
| 7,227,930 | B1* | 6/2007 | Othmer et al. | 379/85 |
| 2004/0136503 | A1* | 7/2004 | Kass | 379/67.1 |
| 2004/0207724 | A1* | 10/2004 | Crouch et al. | 348/14.09 |
| 2007/0211876 | A1* | 9/2007 | Othmer et al. | 379/201.01 |

FOREIGN PATENT DOCUMENTS

| | | |
|---|---|---|
| WO | WO 2008/033030 | 3/2008 |
| WO | WO 2008/102055 | 8/2008 |

OTHER PUBLICATIONS

Annex to Form PCT/ISA/206—Communication Relating to the Results of the Partial International Search mailed Mar. 31, 2010.

* cited by examiner

*Primary Examiner* — Ajit Patel
*Assistant Examiner* — Myron Wyche
(74) *Attorney, Agent, or Firm* — Pearl Cohen Zedek Latzer, LLP

(57) ABSTRACT

A system and method for recording a session is provided. One session related to first and second parties may be established. Another session related to the first party and a recording server may be established. The sessions may be joined, and the common session may be recorded by the recording server. A recorded session may be stored and played back.

30 Claims, 7 Drawing Sheets

SYSTEM AND METHOD FOR RECORDING A COMMUNICATION

CROSS-REFERENCE TO RELATED APPLICATIONS

This application claims the benefit of U.S. Provisional Patent Application No. 61/204,479, filed on Jan. 7, 2009, which is incorporated herein by reference in its entirety.

BACKGROUND OF THE INVENTION

Usage of communication devices and systems has grown dramatically with the introduction of technologies, networks, platforms, devices and other elements that enable a variety of communication methods. In particular, the use of cellular phones has proliferated in recent years. Cellular or mobile phones as well as other communication devices enable and offer a variety of uses and services, e.g., in personal, business, medical, financial, security or educational fields or contexts.

A key difference between communicating using stationary devices and communicating using wireless or mobile devices is that while when a stationary, wired or immobile device is used, a user is typically in an environment such as an office, facility or a home where he may freely use various additional devices or tools that are typically available in such environments. In contrast, a user of a mobile device may be anywhere and may further be involved in activities such as driving, taking a walk or riding a train. Such activities and/or environments typically limit a user's ability to use additional tools or devices. For example, a person conversing over a wired phone from an office may easily use pen and paper to take notes, or bring up and view a relevant web page on a computer, e.g., a map. In contrast, a person communicating using a cellular phone may be unable to take notes or perform activities that may be relevant or even necessary, e.g., write down a phone number provided by a party to the call.

A possible solution may be a recording of calls or sessions, for example, recording all calls related to a specific device or a specific phone number. Such solutions have a number of drawbacks, for example, laws and regulations may prohibit a recording of a call unless all parties have agreed to such recording. Another drawback may be the fact that many people may be uneasy with being recorded. Additionally, recording all calls may produce a large number of recorded calls which in turn makes it difficult to find a specific recording as well as may be costly in terms of storage etc. Current systems and methods fail to enable an easy, quick and/or simple way for a user to selectively record calls or sessions, store the recorded session and/or securely be provided with a recorded session or call. There is a need in the art for a system and method to enable an easy, simple and selective recording of sessions such as telephone calls.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Figure 1:
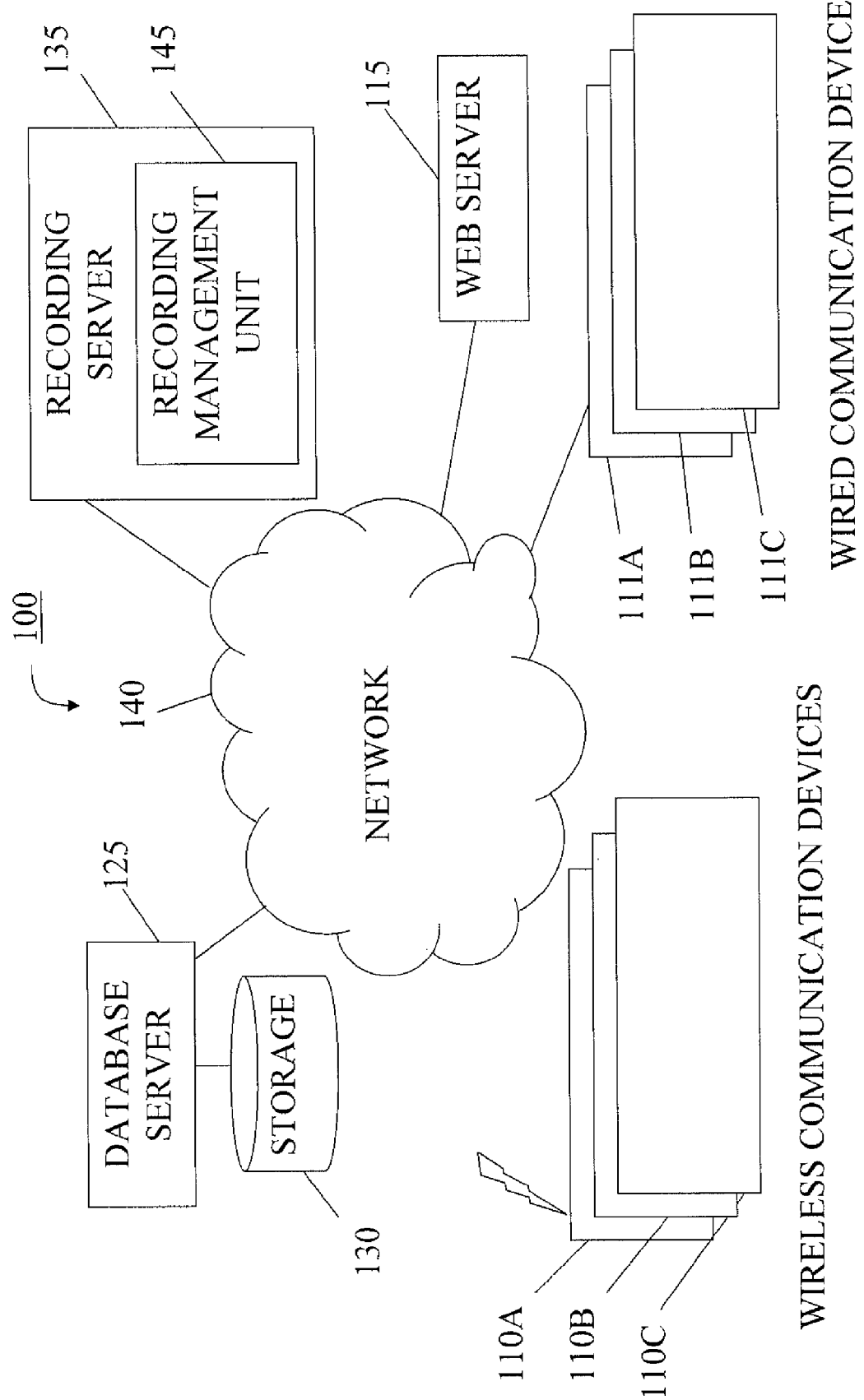
FIG. 1 is a schematic block diagram of an exemplary system according to embodiments of the invention.

Reference is now made to FIG. 1, which shows a schematic block diagram of an exemplary system 100 according to embodiments of the invention. System 100 may include a network 140, a plurality of wireless communication devices 110A-C, each individually connected to network 140 by respective wireless connections, a plurality of wired communication devices 111A-C, each individually connected to network 140 by respective wired connections, a recording server 135, a recording management unit or module 145 operatively connected or related to recording server 135, a web server 115, a database server 125 and a database storage 130, operatively connected to database server 125.

According to embodiments of the present invention, wired communication devices 111A-C may be any suitable wired communication devices. For example, devices 111A-C may be wired or land line telephone devices, which may be connected to a suitable network, e.g., a public switched telephone network (PSTN), an integrated services digital network (ISDN) or any other suitable network as known in the art and as may be included in network 140. Other examples of wired communication devices 111A-C may be a computing device that may be used for establishing sessions and/or conducting calls as described herein and as known in the art. For example, some of communication devices 111A-C may be or may include a personal or home computer, a desktop computer, a laptop computer, a notebook computer, a workstation, a server computer or any suitable computing device capable of establishing sessions or calls as described herein. Wired communication devices 111A-C may be capable of communicating with any applicable device. For example, wired communication device 111A may be able to communicate with wireless communication device 110B, web server 115, wired communication device 111B and as described herein, with recording server 135 and/or database server 125.

Wireless communication devices 110A-C may be or may include a mobile communication device, a wireless personal digital assistant (PDA) device, a mobile or cellular phone or device, for example, an Apple™ iPhone™, a mobile computer, or any computing device equipped with wireless communication capabilities and/or otherwise capable of wirelessly communicating with other computing or communication devices or networks. For example, wireless communication device 110A may be able to communicate with wireless communication device 110B, web server 115, wired communication device 111B and as described herein, with recording server 135, recording management unit 145 and/or database server 125. As described further below, wireless communication devices may have more than one channel of wireless communication and/or be wirelessly connected to two or more networks. For example, some wireless mobile devices may have both data and voice channels available. The channels may operate over the same network, or over separate networks. For example, a wireless communication device may be connected to a cellular telephone network and to a wireless data network, e.g., over an IEEE 802.11 protocol.

According to embodiments of the present invention, recording server 135, web server 115 and database server 125 may be or may include any one or more suitable server computers as known in the art. For example, recording server 135, web server 115 and database server 125 may be or may include a personal computer, a desktop computer, a workstation, a server computer, a tablet computer, a network device and/or any other suitable computing device. According to embodiments of the present invention, storage 130 may include, for example, a hard disk drive, a floppy disk drive, a Compact Disk (CD) drive, a CD-Recordable (CD-R) drive, or other suitable removable and/or fixed storage unit.

Recording server 135, web server 115 and database server 125 may include a processor and a memory unit, which may comprise for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Recording server 135, web server 115 and database server 125 may include hardware, software or firmware enabling them to communicate over any applicable network and with any applicable devices as described herein. For example, recording server 135, web server 115 and database server 125 may include a modem that may enable them to call a telephone or answer a call from a telephone or similar device, e.g., a mobile phone. Accordingly, a phrase such as "calling a server" may refer to calling a number associated with a server and establishing a call or session between a server, (possibly with the aid of a modem or similar device), and a human caller or party.

Network 140 may be, may comprise or may be part of a private or public internet protocol (IP) network, or the internet, or a combination thereof. Additionally or alternatively, network 140 may be, comprise, support or be part of a global system for mobile communications (GSM) network. For example, network 140 may include or comprise an IP network such as the internet, a GSM related network, a PSTN and/or any equipment for bridging or otherwise connecting such networks as known in the art. Network 140 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 140 are implied but not shown, e.g., access points, base stations, communication satellites, GPS satellites, routers, bridges, telephone switches, etc. It will be recognized that embodiments of the invention are not limited by the nature of network 140.

Recording management unit 145 may be or may comprise software, hardware, firmware or any combination thereof. For example, recording management unit 145 may be an application executing on or with relation to recording server 135 as shown. Recording management unit 145 may perform any required operations as described herein, for example, recording management unit 145 may activate, control or manage components such as a hardware recording unit, a storage device or it may control or manage applications related to a recording. Recording management unit 145 may interact with database server 125 to obtain any applicable information, e.g., user profiles, list of recorded calls or any other related information that may be stored, for example on storage 130. Recording management unit 145 may interact with user devices. For example, recording management unit 145 may interact with wireless or wired communication devices such as exemplary devices 110A-C and 111A-C. For example, as described herein, recording management unit 145 may be included, as a party or in another capacity, in a session or call.

For the sake of simplicity, not all entities recording management unit 145 or other components of system 100 may interact with are shown in FIG. 1. However, recording management unit 145 or other components of system 100 may interact with any computing device, system or network in order to obtain, receive or communicate information, data or parameters that may be used as described herein. Although recording management unit 145 is shown with relation to recording server 135, e.g., as an application thereon, recording management unit 145 may be operatively connected to any suitable computing device. For example, recording management unit 145 may be an application running on wired communication device 111C or on web server 115. Any functionalities, characteristics or aspects related to recording management unit 145 as described herein may be realized on any suitable computing device, e.g., those shown in FIG. 1 and/or as described herein.

Embodiments of the invention enable selective and/or dynamic recording of sessions. Embodiments of the invention also enable remotely initiating a recording, for example, by a mobile communication device causing a remote recording server to record an ongoing session or a future session or call. For the sake of simplicity and clarity, telephone calls, phone calls, conversations or simply calls will mostly be discussed and referred to herein, however, it will be recognized that any applicable sessions may be recorded, stored and played-back according to embodiments of the invention as described herein. For example, calls or sessions including one or more users who are using a computer (and possibly voice over IP technology) or calls including an automatic answering application (e.g., an interactive voice response (IVR) application or an automated voice response (AVR) application) may be recorded, stored and played-back as described herein. Any relevant data, parameter or information related to a call or session may be recorded and played-back as described herein. For example, sessions including communication of multimedia data, e.g., video and/or audio data may be recorded and replayed as described herein. Accordingly, it will be recognized that embodiments of the present invention are not limited to a specific communication device, nor to a specific communication session or information communicated or exchanged in a session or call. A call or session as described and/or discussed herein may include any number of participants or parties, accordingly, the terms "call" and "session" may be used interchangeably herein and may refer to a call or session related to or including any number of parties that may be human and/or nonhuman. For example, a call or session may include a number of people, an IVR application and a recording server.

A call or session related to or associated with three or more communication devices may be referred to herein as a conference call, for example, among a wireless communication device, a wired communication device, and a recording server. A conference call as referred to herein may be a conference call as known in the art, namely, a call including or related to three or more parties using respective telecommunications equipment. Embodiments of the invention are not limited to conference calls as implemented by carriers today. Any method of combining, linking, joining, associating or otherwise relating sessions or calls may be applicable to, or implemented by embodiments of the invention without departing from the scope of the present invention. Any such associating or relating sessions may be referred to herein as establishing a conference call. According to embodiment of the invention, a conference call may be established by establishing a first session related to a first and second parties, establishing a second session related to the first party and related to a third party that may be a computing device and establishing a third session that includes the first and second sessions.

According to embodiments of the invention, a party to a call may initiate a recording of the call at any time. For example, in one embodiment, after a call or session has been established, or at any time when a call is in progress, a party to the call may initiate a recording of the call, as described below. In another embodiment, a caller may first initiate a recording and then establish a call or session with another party. In some embodiments, any party to a call may initiate a recording of the call. For example, the calling party, the called party or parties that were included in the call by teleconferencing techniques or methods may all initiate a recording of a call they are a party to. As described herein, embodiments of the invention enable a user who initiated a recording to listen to the recording. According to embodiments of the invention, security measures as described herein enable protecting recorded calls from being obtained or listened to by unauthorized entities. As described herein, in some embodiments, a user may enable a trusted person or entity to listen to or obtain a recording of a call.

In some embodiments, a method or flow of recording a session may include establishing a session between a mobile communication device and a recording server. For example, a user may use a mobile or cellular phone to call a recording server, or a software application programmed and operating on a processor on a user's device may automatically call a recording server at a designated telephone number upon detecting specific conditions. For example, a smartphone may be configured, e.g., by configuring an application being executed thereon, to call a recording server upon establishment of a call or session having one or more pre-programmed characteristics, e.g., upon detecting an establishment of a call with a specific phone number, area code, time of day, etc. The one or more characteristic may be stored in a memory on the mobile communication device, and accessed upon telephonic communication (incoming or outgoing call) so as to determine whether to automatically initiate a recording. In some embodiments, an application may initiate communication with the recording server manually, by the user pressing a button, e.g., "record" on the keypad of the mobile communication device. In other embodiments, initiating a recording may be automatic. For example, a list of telephone numbers or other identification parameters may be created by a user and stored in a memory on the mobile communication device. In some embodiments, upon detecting a session or call was established between the mobile communication device and a second communication device, an application on the mobile communication device may examine such list and may determine if an identification parameter associated with the second communication device is included in the list. If so, the application may cause a recording of the session, e.g., by automatically establishing a session with a recording server, joining the two sessions described above into a common session or otherwise linking the two sessions, and causing the recording server to record the common session. Accordingly, a user may configure a communication device to automatically record calls made to predefined numbers.

In some embodiments, an application may initiate communication with the recording server manually, by the user pressing a button, e.g., "record" on the keypad of the mobile communication device. Upon receiving a call from a mobile communication device, the flow may include obtaining a user record at the recording server based on an identification number associated with the mobile communication device. For example, a recording server may use the phone number of the calling device, e.g., the caller ID (CID), to locate a user record. As described herein, a user may be associated with a user record, which may be identified, located, accessed, used for billing, and/or otherwise used. Such user record may contain user preferences, configuration parameters or any applicable data or information related to the user. A user record may be located or identified based on a phone number of the user. Accordingly, upon detecting a call or session related to a specific phone number, a recording server may locate the relevant user record. Various operations as described herein may be affected by information in a user profile. For example, a payment preference, e.g., how and/or when to bill a user, a recording quality (that may affect required storage volume), controls, e.g., association of keys on a keypad with predefined operations performed by a recording server, e.g., a designation of a specific keypad control key for commencing, pausing or terminating a recording, a configuration of audible feedback from a recording server during the recorded call, e.g., the recording server may be silent, may report warnings and/or errors by preconfigured sounds or audible effects. Such configuration issues may be reflected in a user profile and, accordingly, may be different for different users.

The flow may include establishing a wireless communication session between the mobile communication device and another communication device, e.g., another wireless phone, a wired phone, a home computer using VoIP or any other applicable party. The flow may include joining the wireless communication sessions with party and recording server into a common session. For example, a conference call as known in the art may be established to include the recording server and the two parties. The flow may include recording the common session. For example, the recording server may automatically record a session to which it is party, or it may do so based on a signal from one of the parties or according to conditions, e.g., as specified in the relevant user profile described herein. The recording server may store a recorded session and may provide a playback of recorded sessions as described herein. Storage of a recorded session may be in association with a user's record. For example, the phone number of the user may be associated with a file containing recorded information. Accordingly, recorded sessions related to a specific user may be located based on the user's phone number that may be readily available, e.g., upon establishing a future session with the user and receiving caller identification (CID) information as known in the art.

The system may store recorded sessions or calls in association with an index parameter. For example, an index parameter may be complied based on one or more parameters such as a date, a time, a party identification, or related parameter, a recording duration and/or an audible comment recorded by the user. Accordingly, as described herein, a user may locate a recorded session based on any one or more parameters related to the session. For example, recorded sessions may be listed and/or selected based on their respective duration, date, participants etc., e.g., sorted lists may be presented where a sorting criteria may be selected. A user may access a web server by a data connection, and log in, thereby obtaining access to a list of recorded sessions. The sessions may be sorted and/or accessed based on one or more indexing parameters, and a selected sessions may be played back over the data connection. In some embodiments, the storage may be accessed by a phone connection to a playback server, which may allow a user to select a recorded session, e.g., via recording date, time, or other parameter. In some embodiments, the playback server may play an indexing parameter audibly, e.g., the recording date, time, or a recorded indexing comment by the user, and allow the user to select a recorded session, for example, by pushing a key on the keypad. In some embodiments of the invention, an audible indexing parameter may be a clip selected at random, which may be played back to the user to remind the user of the content of the recorded session.

Figure 2:
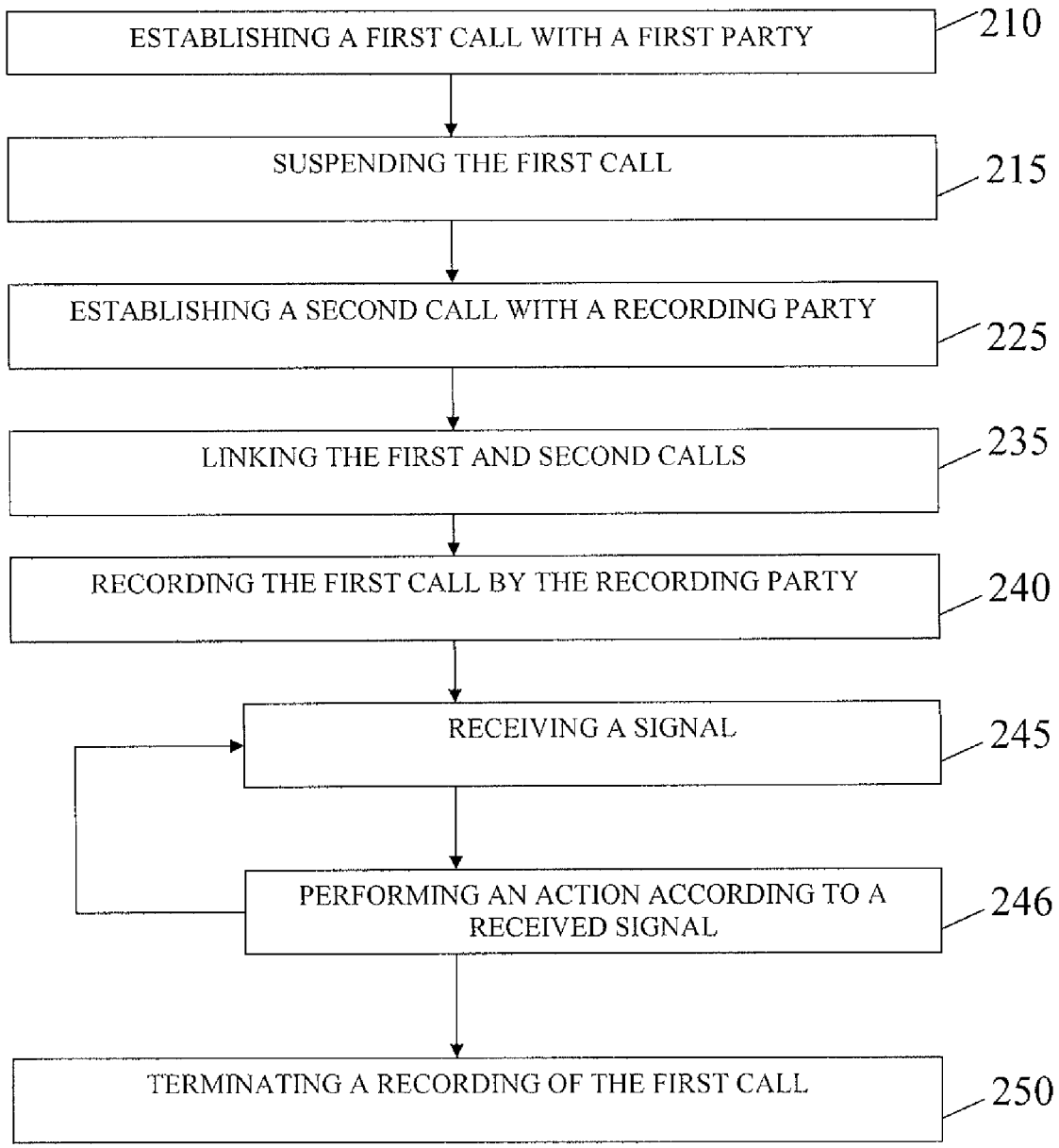
FIG. 2 is an exemplary flowchart describing a method of recording a call according to embodiments of the invention.

Reference is now made to FIG. 2, which shows an exemplary flowchart describing a method of recording a call according to embodiments of the invention. According to embodiments of the invention and as shown by block 210, a method or flow of recording a call may include, or begin by, establishing a first session or call related to a first and second parties. For example, a caller may use a mobile wireless or other phone to dial a phone or subscriber number to call another person, a service or an establishment, e.g., call a friend, a pizza take away service, or a bank. As shown by block 215, the method may include suspending the first call. For example, after a call with another person has been established, the caller may suspend the call. Suspending the call may include putting the other party on hold or using any methods of suspending a call as known in the art. In some embodiments, e.g., when the called party is a person, the caller may notify the called party that they are being put on hold. In other embodiments, e.g., when the call established is between a human caller and an answering system, the caller may simply put the call on hold or otherwise suspend the call.

As shown by block 225, the method may include establishing a second call or session with a recording party. According to embodiments of the invention, a recording party may be any device, system or component capable and/or configured to record a call as described herein. For example, after a first call was established as shown by block 210 and possibly suspended as shown by block 215, the caller may establish a call with a recording party or entity, e.g., recording server 135 and/or recording management unit 145. In some embodiments, a quick-key or other speed-dialing techniques may be used. As known in the art, speed dial is a technique that enables a user to quickly and easily place calls by pressing a reduced number of keys. For example, pressing a predefined key on a phone's keypad for a predefined period of time (e.g., two seconds) also known in the art as press and hold, may cause the phone to call a predefined number. Most current phones or related communication devices support a speed dial function by storing a predefined number in a memory of the device, associating the number with a specific key and calling the stored number when the associated key is pressed for a predefined period of time or when a predefined sequence of keys is pressed. Accordingly, a number that when dialed will cause a phone or other communication device to call a recording system such as recording server 135 may be configured to be dialed by a quick-key or speed dial key. Consequently, a user wishing to record a call established as shown by block 210 may suspend the call as shown by block 215 and establish a call with a recording server or system by speed dialing a preconfigured number to establish a session with the recording system as shown by block 225.

Although not shown in FIG. 2, the method may include receiving an indication from the recording party indicating a recording is in progress. For example, upon establishing a call or session or upon detecting an incoming call, recording management unit 145 may automatically cause recording components on recording server 135 to begin recording the incoming call. Recording management unit 145 may further determine or ascertain a recording of the call is in progress and, contingent on ascertaining a recording is being performed may provide an indication to the caller. For example, a audio indication, e.g., a dual-tone multi frequency (DTMF) signal that may produce a distinct beep sound may be generated by recording management unit 145 to inform a caller that a recording is ongoing. According to embodiments of the invention, instead or in addition to a DTMF or other tone, a pre-recorded message may be played, e.g., a message saying "recording in progress" may be automatically played when a recording has begun. According to embodiments of the invention, if a recording can not be performed as described herein a different tone or message may be produced indicating to the caller (who might expect a recording to be commenced) that a recording is not being performed. For example, if a malfunction or other problem in recording server 135 or a related component is detected, a message saying "recording can not be performed" may be automatically played by recording management 145 or a specific tone may be generated thus indicating to a caller that a recording is not being performed. A message indicating that a recording is not being performed may be generated upon or shortly after establishing a call as shown by block 225 or at any point in time during recording a call as described herein if or when conditions disabling a recording of a call are present and/or detected. Any means or methods known in the art for enabling or configuring computing devices to provide humans or other entities with indications may be employed by embodiments of the invention without departing from the scope of the invention.

As shown by block 235, the method may include linking the first and second calls. For example, any conferencing techniques known in the art may be employed by embodiments of the invention. For example, in a similar way a caller may call a first and second party and establish a conference call including the caller, the first and second parties, a caller may call a first party as shown by block 210, a second party, that may be recording server 135, and establish a conference call that includes the caller, the first party and recording server 135. It will be recognized that although linking two or more sessions or calls may be by establishing a conference call as known in the art, other possibilities exist. For example, proper technology or equipment, e.g., switching equipment, may enable other forms or methods of linking, combining, relating or otherwise associating a plurality of sessions or calls. For example, a linkage of two calls, the first including "A" and "B" and the second including "A" and "C" may be such that while "C" can hear "B", "B" can not hear "C". For example, a recording server may be provided with any audio or other data produced by a party to a call while such party is prevented from receiving any data produced or communicated by the recording server. Other forms of linkage may be selective with respect to data, for example, while voice data from a party may be provided to a recording server, signals produced by such party's communication equipment may not be provided to the server, thus, for example, a party may be prevented from controlling the recording server as described herein. Accordingly, embodiments of the invention are not limited by the type, nature or method of linking a plurality of sessions.

Figure 6:
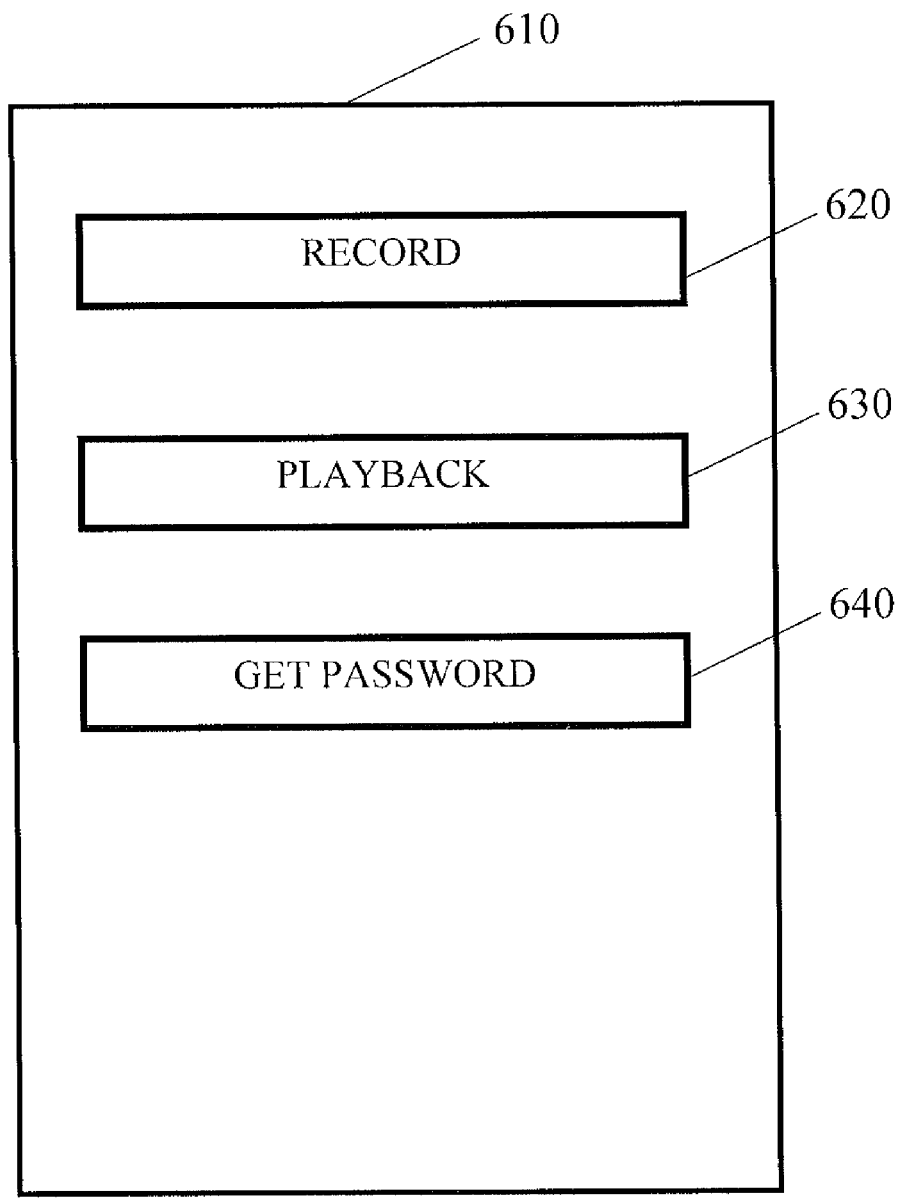
FIG. 6 shows an exemplary screenshot according to embodiments of the invention.

It will be recognized that blocks 215, 225, and 235 may be performed automatedly by a software application stored on the mobile communication device and executed by a processor associated therewith. For example, recording of calls made to preconfigured phone numbers may be performed automatically as described herein. In another embodiment, calls made during specific hours may be automatically recorded. Any parameters, conditions or applicable aspects may be used, e.g., to configure an application on a user's mobile communication device to commence automatic recording. Accordingly, functions or other aspects described herein with respect to at least blocks 215, 225 and 235 may be automatically performed. For example, during a call with a first party (block 210), a user may press a button or icon on the mobile communication device, which may initiate a sequence to perform blocks 215, 225, 235. For example, in some embodiments, the application may display a screen, as depicted in FIG. 6, and upon the user's pressing a record button, e.g., 620, the mobile communication device may be instructed to suspend the first call, establish a second call with the recording party (for example, by determining and locating a phone number for the recording server, as described further below), and link the first and second calls. It will be recognized that the recording server may, in turn, perform an authentication process to determine that the party calling the recording server is entitled to use the recording service.

As shown by block 240, the method may include recording the first call by the recording party. For example, recording server 135 may be the recording party that may have been included in a session as shown by block 225. For example, recording server 135 may have been included in a session by establishing a conference call including a caller, a called party and recording server 135. Accordingly, included in a conference call, recording server 135 may record the conference call. Typically but not necessarily, recording server 135 may produce no audible output or signals during a recording of a call, accordingly, recording server may effectively record the call between the caller and the called parties. According to some embodiments of the invention, an action may be required to initiate recording, e.g., a user may be requested to push a button, such that the user may link the calls, request permission from the other party, and then upon receiving it, push a button to commence recording. However, it will be recognized that the order of blocks 235 and 240 may be reversed. That is, in some embodiments of the invention, the recording may begin before linking the first and second calls, e.g., immediately upon authentication of the user.

As shown by block 245, the method may include receiving at the recording server a signal from the mobile communication device. For example, recording management unit 145 may be configured to receive, detect or obtain one or more predefined DTMF signals from the mobile communication device, and to further perform or cause a performance of predefined actions based on such predefined DTMF signals. As shown by block 246, the method may include performing an action according to a received signal. For example, upon receiving a predefined DTMF signal or tone from the mobile communication device, recording management unit 145 may cause a termination of a recording as described herein. Various options and/or actions may be set or executed by sending signals to a recording server as shown by blocks 245 and 246 in FIG. 2 and as described herein. For example, commence recording, pause recording, insert a bookmark, and/or index the session being recorded. For example, bookmarks may be associated with a call and may later be used during playback, e.g., in order to navigate through a call. For example, by pressing a predefined key on a keypad while a recording is in progress, a bookmark may be associated at the recording server with a specific time in a recording. Any applicable number of bookmarks may be associated with a recorded call. When later playing back a recording, as described herein, a user may skip or jump forward or backward to a bookmark, e.g., by pressing a predefined key on a keypad of a phone, or a computer keyboard. For example, when recording a call, a user may place bookmarks at a number of times during the call, e.g., when issues of particular importance are discussed. At a later time, when listening to the recording, the user may scroll through bookmarks, or skip to a bookmark thus find a previously marked section of the call. In some playback modes, the playback server may play back highlights, for example, by playing a number of seconds before and after each bookmark during a recorded session.

Configuration parameters may be set, cleared or modified by signals as shown by blocks 245 and 246. For example, a server may be configured to provide audible indications or operate in silent mode, e.g., provide no audible indications. For example, a server may provide an audible indication reflecting a recording state, e.g., a beep sound may be produced when a recording starts or periodically when a recording is in progress thus notifying and/or reminding a caller of a state, mode or other operational aspects of a recording server. In some embodiments, by pressing a predefined key a caller may change a configuration of a recording server, for example, cause to server to provide audible or other indications or avoid providing indications. According to some embodiments, any configuration parameters may be preset.

For example, a user profile, which may be associated with a specific phone number, may contain configuration parameters such as audible indications on/off settings, recording quality settings etc. Indications as described herein are not limited to audio. For example, a recording server may cause a visual indication to be displayed on a display of a computing device. For example, a recording server may send data or information that may cause a recording or other indication to be displayed on a mobile phone's screen or on other computing devices' screens. In some embodiments, e.g., when voice over internet protocol (VoIP) is used, a recording server may send metadata or other data to one or more participants in a call. Such metadata may cause an application on a user device to provide various visual, audible or other multimedia or other types of indications to be presented or provided to a user, e.g., indications similar to those known in the art with relation to chat applications. Yet another function or action that may be initiated or cause as shown by blocks 245 and 246 may be a predefined length recording. For example, a server may be configured to perform a twenty (20) seconds recording upon receiving a predefined signal, e.g., one produced by pressing a predefined key on a phone's keypad. Such feature may enable a call party to cause a short recording, e.g., when a specific, possibly short part of a call is to be recorded, for example, a number being provided by another party or another discrete piece of information to be recorded. Such configuration may be favorable as it may reduce storage and further enable a user to quickly find relevant recorded information rather than having to scroll through or listen to long recordings when searching for a specific part of a call.

According to embodiments of the invention, a user may associate any identifier or other metadata with a recorded session. For example, a user may record a description of a call, e.g., the time and date or names, phone numbers or other parameters related to participants and may further attach such recorded description to a call. When a user wants to listen to recorded calls, a recording server (or database server storing the recorded calls) may be configured to replay a call description. For example, prior to replaying a recording, a call description may be played, thus a user may quickly and easily identify recorded calls without having to listen to them first. Other signals and controls may cause a server to change a list of callers who may control a recording. For example, in one embodiment, control of a recording server, e.g., start/stop/pause a recording may be enabled for all participants in a call. For example, if the tones produced by the "9" key of a touchtone device are configured to cause a recording server to pause a recording then in such configuration, any participant in a call may press, at any time and possibly accidentally, the "9" key and thus pause a recording of the call. In some embodiments, as described herein, only a selected group or participant may control the recording server.

In some embodiments, a party to a call controlling a recording server may also enable other parties to control the recording server. For example, a predefined signal that may be generated as described herein may cause a recording server to respond to signals originating from any source, e.g., any device associated with the call. Such or other signal may cause the recording server to toggle between modes of operation. For example, a party controlling the server may press the "4" key to enable other parties to control the server and may press the "4" again in order to prevent other parties from controlling the recording server. On the server side, an application such as recording management unit 145 may, upon receiving a signal generated by the "4" key select an operational mode that may be such that only signals from a specific source are acted upon and signals from other sources are ignored or an operational mode whereby signals from any source, e.g., any one of the parties to a call are processed and possibly acted according to.

It will be recognized that while signals or indications may be realized using DTMF as described herein, any applicable or suitable signaling methods may be used. For example, asynchronous transfer mode (ATM) signaling or voice over internet protocol (VoIP) call signaling may all be used by embodiments of the invention. For example, VoIP or ATM enabled devices may produce signals as defined by these technologies or a predefined key sequence pressed by a caller using a cellular phone may be translated, transformed or converted to any signaling information according to any applicable or suitable system or method and may be used by embodiments of the invention. For example, a caller may produce DTMF or other signals in order to communicate an instruction to a recording server to commence, pause or cease a recording. A recording server or an application thereon, e.g., recording management application 145 may produce DTMF signals or in order to communicate or provide an indication or feedback, e.g., to indicate that a recording has begun, been paused or terminated. Accordingly, recording management 145 or another component in recording server 135 may receive a signal that may be a DTMF tone and perform an action as described herein and may further provide various indications, feedback or prompt using such or other signaling method. For example and as shown by block 250, a recording of a call may be terminated upon receiving a signal that may be a DTMF signal or another signal, for example, a signal produced by a telephone or a switching component in a network upon termination of a call, e.g., a on-hook signal resulting from placing a phone hand set in its cradle.

Various operations, event generations, tasks, functionalities or other aspects may be performed, caused, implemented or affected automatically. For example, an application on a user's device may automatically call a recording server upon detecting any applicable condition or event. For example, word spotting or other speech analysis techniques may be used to commence a recording, e.g., upon determining specific language or tone of voice are used. Likewise, a termination or pause of a recording may be automatic, e.g., long periods of silence may cause an application on a smartphone or on a recording server to pause a recording thus reduce required storage or bandwidth resources. An application on a smartphone may convert human voice commands to instructions to a recording server. For example, commands spoken by a user, e.g., "record", "pause", "play" or other may be converted to signals and communicated to a recording server, e.g., as described herein. Accordingly, any applicable operations described herein, e.g., with respect to FIGS. 2 and 3 may be performed automatically.

The method described herein with reference to FIG. 2 may be implemented by system 100 shown in FIG. 1. For example, a user (hereinafter "calling party") operating wireless communication device 110B that may be a mobile phone may call a user (hereinafter "called party") operating communication device 111B that may be a wired telephone. The called party may pick up the phone, at such point in time, a first call may be established as shown by block 210. The calling party may then suspend the call established with the called party as shown by block 215 and may further call recording server 135. On server 135, recording management unit 145 may answer the incoming call thus a second call may be established as shown by block 225. Recording management unit 145 may instruct or otherwise cause any relevant components on server 135 to commence a recording of the call established as shown in block 225 and may further provide an indication to the caller that a recording of the call is now in progress. When the calling party receives an indication that a recording is in progress, he may establish a conference call that includes himself (the calling party) the user operating communication device 111B (the called party) and recording server 135 (the recording party) or an application thereon, e.g., recording application 145. As known in the art, in a conference call, all parties are provided with information such as audio, video or signaling information produced by all other parties. For example, all parties in a conference call may hear and/or see all other parties. Accordingly, server 135 may "hear" or "see" all other parties, namely, server 135 may be provided with information, parameters and data related to audio, video and/or signaling information produced by all other parties and/or devices operated by parties of the session. Accordingly, server 135 may be able to record any such information thus effectively record the session or call including all other parties to the conference call.

It will be recognized that the method described herein with reference to FIG. 2 is not constrained to the particular order shown. For example, in some embodiments, a recording party (e.g., server 135 in FIG. 1) may be called and a recording may be commenced prior to calling a second party. For example, the operations or functionalities shown by block 225 in FIG. 2 may be performed before those shown in blocks 210 and 215. In such case, a user may first call a recording server, the server may automatically or otherwise begin to record the call and the user may then call a party and further establish a conference call or other session including the recording server and the called party. Such scenario may be preferable in cases where the calling party wishes to record the entire call, e.g., from the moment the called party picks up the phone. It will also be recognized that suspending the call as shown by block 215 may be omitted. Any method, technique or way of creating a 3-way call to include three parties in a call or session or creating a conference call to include three or more parties in a call or session may be implemented without departing from the scope of the invention.

A recording server or entity may be included in a call or session by any party at any time the call is in progress. In some embodiments of the invention, a recording server may automatically commence recording a call upon being included in a call, accordingly, including a recording server in a call may automatically cause a recording of the call. For example, five different people who may be in five different geographic locations may be included in a conference call. A recording server may be included in such conference call, e.g., by the person who initiated the call prior to the inclusion of the other parties. Alternatively, a recording server may be included in the call after some of the parties were included or after all five people have been included. In other scenarios, a caller may initiate a call by calling a first party, include a number of parties in the call and then one of the parties previously included by the initiator of the call may include a recording server to begin a recording of the call. Accordingly, a recording server may be included in the call by a caller who initiated the call or by a party who was included in the call by the caller or by a party who was included in the call by another party.

In some embodiments of the invention, the call to the recording server may be initiated by a touch command, e.g., activating an icon on the screen, as described herein. In other embodiments of the invention, the call to the recording server may be initiated by a voice command. For example, in some embodiments of the invention, the call to the recording server may be voice-activated, for example, using voice recognition technology. Some mobile communication devices may include built-in voice recognition or speech-to-text software modules, such that the processor of the device may receive a voice signal and convert the voice signal to a corresponding text. A user may store preferences, for example, in a memory associated with the device, including certain voice commands corresponding to desired actions. Thus, for example, a user may store the text "CALL RECORDING NOW" as a command to initiate a call to a recording server. In some embodiments of the invention having voice-activated commands, the mobile communication device may also have voice identification software. Thus, the application may determine to call the recording server only when the user says "CALL RECORDING NOW" and not when another party to the call says the same words.

As described herein, a recording server may be controlled, e.g., by DTMF or voice signals. For example, recording management unit 145 may be provided with any DTMF signal that may have been produced by any party to a call being recorded or a call in which recording server 135 is a party to. Recording management unit 145 may further be configured to interpret a DTMF signal or a sequence of DTMF signals as a command. For example, a DTMF signal produced by the "*" key on a touch-tone keypad as known in the art may be interpreted as a command to pause a recording, a DTMF signal produced by the "#" key on a keypad may be interpreted as a command to resume a recording and so on. Likewise, a sequence of DTMF signals may be interpreted as a command. Accordingly, any applicable or relevant command may be issued by a party to a call and may be supported and/or performed, e.g., by recording management unit 145 and/or recording server 135.

Although various commands may be supported, in some embodiments of the invention a reduced or minimal set of commands may be used for recording a call. For example, a recording may be initiated automatically, e.g., by calling the recording server. In such embodiment, a recording server may start recording a call upon being included in the call. In the cases where a reduced and simple set of commands is desired, a recording server may operate in toggle mode. For example, while recording a call, the recording server may terminate or pause the recording upon receiving a predefined DTMF signal or any DTMF signal, likewise, while the recording server is included in a call but is not recording it, the recording server may resume or start recording the call upon receiving a predefined DTMF signal or upon receiving any DTMF signal. Accordingly, a party to a call may pause and resume a recording of a call by pressing the appropriate keys or, in some embodiments, by pressing any key on a keypad. For example, the "9" key may cause a server to start a recording of the call, the "8" may cause the recording server to pause a recording, the "7" key may cause the server to resume a paused recording and the "6" key may cause a termination of a recording. According to embodiments of the invention, if a recording of a call has been terminated, e.g., by pressing the "6" as described herein, a new recording may be initiated, e.g., by pressing the "9" key as described herein.

As described herein, any party to a call may include a recording server in a call, e.g., by calling the recording server and establishing a conference call including the server and other parties. For example, a conference call as known in the art may include a number of parties and a recording server. As described herein, including a recording server or entity may be performed at any time, for example, before the conference call is established or after some or all other parties are included in the call. In some embodiments of the invention, control of the recording server may be performed by any party to a call, for example, by the party who called the recording server and/or included the recording server in the call or by other parties. For example, after a recording server has been included in a call, any party included in the call may press the "9" key at any time in order to cause a recording server to pause or terminate a recording or press the "9" or other key in order to cause a recording server to resume or start a recording of the call.

In other embodiments of the invention, control of the recording server or system may only be enabled for a specific party or group. For example, switching components in a network may identify a source of a signal, e.g., a DTMF signal. Such components may add metadata to a signal that may be specific to, or based on the source of the signal. Accordingly, a recording server may identify a signal and a source of the signal and may only respond to signals from a specific source. For example, a switching component may determine the phone or subscriber number associated with received data. The switching component may generate a unique identifier based on a phone or subscriber number of the device producing the signals and may further attach such identifier to data communicated to the recording server. Such configuration may enable a recording server to identify a source of data and/or signals and may further enable a recording server to only respond to commands from a specific party. For example, a caller who includes a recording server in a call, e.g., by calling the recording server and including it in an ongoing call may be identified and denoted by the recording server as the managing entity. A switching component in a network may attach an identifier to data, e.g., voice or signals, based on the origin or source of the data. Such embodiment, setup or configuration may enable a specific party to control a recording of the call while preventing other parties from controlling the recording, e.g., terminate, pause or resume a recording. Such configuration may ensure that parties other than a controlling party don't intentionally or unintentionally pause, resume, terminate or otherwise control a recording of a call.

In some embodiments of the invention, the controls may be voice-activated, for example, using voice recognition technology. Some mobile communication devices may include built-in voice recognition or speech-to-text software modules, such that the processor of the device may receive a voice signal and convert the voice signal to a corresponding text. A user may store preferences, for example, in a memory associated with the device, including certain voice commands corresponding to desired actions. Thus, for example, a user may store the text "START RECORDING NOW" as a command to initiate a recording session. If the recording server is already connected to the call, then based on receiving the voice-activated command, which is converted to the command text, e.g., "START RECORDING NOW", the application may cause the recording server to start recording, for example, using any of the methods described herein, e.g., by producing a corresponding DTMF tone. Similarly, the mobile device may have stored thereon other voice-activated commands and corresponding text, e.g., "PAUSE RECORDING", "BOOKMARK HERE" and others, which the application may convert to commands to be performed by the recording server, e.g., via a corresponding DTMF tone. In some embodiments of the invention having voice-activated commands, the mobile communication device may also have voice identification software. Thus, the application may determine to pause recording only when the user says "PAUSE RECORDING" and not when another party to the call says the same words.

In some embodiments of the invention, a recording server may be used to record notes or other information. In such embodiments, a system such as system 100 may be used in ways similar to using a private recording device, e.g., a tape recorder or an electronic recording device. In one embodiments, a caller may call a recording server, e.g., recording server 135. As described herein, recording server 135 may be configured to automatically begin to record a call it is included in. Accordingly, upon a call with a recording server being established, the caller may begin to speak or produce other audio or audible data and/or provide video data and such data may be recorded by the recording server. For example, a person needing to remember a phone number, instructions or directions may call a recording server, e.g., using speed dialing, and repeat the information to be memorized. As described herein, any data produced by the caller may be recorded by the recording server. According to embodiments of the invention, a recording server may terminate a recording upon receiving a signal as described herein or by determining that the call has been terminated. Accordingly, a caller may call a recording server, e.g., by a speed dialing, say what he wants recorded and hang up. Such simple and quick procedure may produce a recording of spoken, imaged or other information or data. For example, at any point in time, a person wanting to record an event may simply hit the proper speed dial sequence and record an event. Thus, for example, the flow of FIG. 2 may be performed omitting blocks 210, 215, and 235.

According to embodiments of the invention, a recording server may store a recording of a conversation, session or call and/or may cause a storage of a recording of a call and related information. For example, recording server 135 or recording management unit 145 may communicate a recording of a session to database server 125 which may store a recording of the session on storage 130 shown in FIG. 1. Any related or relevant data, information or parameters may be stored in association with a recording of a call. For example, metadata generated, computed or otherwise obtained may be stored and further associated with a storage of a recording. For example, the date and time of the call, parameters such as phone or subscriber numbers of participants, call duration and the like may all be stored. Additionally, one or more identifier may be generated for each recording, such identifiers may be unique, e.g., no two recordings may be associated with the same identifier. For example, an identifier may include or be based on parameters such as date and time, phone or subscriber numbers, randomly generated numbers etc. Identifiers generated and stored as described herein may be used in order to locate or reference a recording as further described herein.

According to embodiments of the invention, a recording server may process a recording prior to or after storing it. Any processing may be performed with relation to recorded or obtained data. For example, processing of audio data may comprise removal of background noise or other processing aimed at improving a quality of audible data as known in the art. Other processing may include encrypting data in order to enhance security or privacy aspects of stored data or compressing data in order to reduce storage consumption. It will be recognized that any processing that may be performed by a computing device with relation to data such as audio or video data received by a recording server may be performed by embodiments of the invention, accordingly, embodiments of the invention are not limited by the type, nature or other aspects of processing of data as described herein.

According to embodiments of the invention, recorded calls or sessions may be listened to or otherwise provided, e.g., a playback of recorded calls may be performed.

According to embodiments of the invention, a playback flow may include establishing a session (also referred to herein as a "playback session") between a mobile communication device and the playback server. It will be recognized that in some embodiments, the playback server may be a separate server than the recording server, as described herein, while in other embodiments, the playback server may be on the same device as the recording server. The recording and playback servers may be accessed by the same access phone number, or by different access phone numbers, as described herein. The playback server may be configured similarly to the recording server, e.g., it may have access to the database server and storage, in order to retrieve recorded sessions and data associated therewith.

As described herein, a play back of a recorded call may be performed automatically, e.g., a playback server may commence a playback of recorded calls upon establishment of a session or call between the server and a communication device related to the recording of the call or calls. As described herein, a playback of recorded calls may be provided to a number of devices. For example, after establishing a conference call as known in the art, a user may include a server in the conference call and may further cause the server to playback recorded calls thus enabling the parties to the conference call to listen to the recording. As described herein, performing a playback may be contingent on an authentication. For example, a user may be authenticated and/or a device may be authenticated. For example, a user may be prompted to provide a password and, contingent on verifying, authenticating and/or validating the provided password, a playback may be performed. In other embodiments and as further described herein, a playback may only be performed after verifying the phone or subscriber number of the device used by a user meets a predefined criteria.

Figure 3:
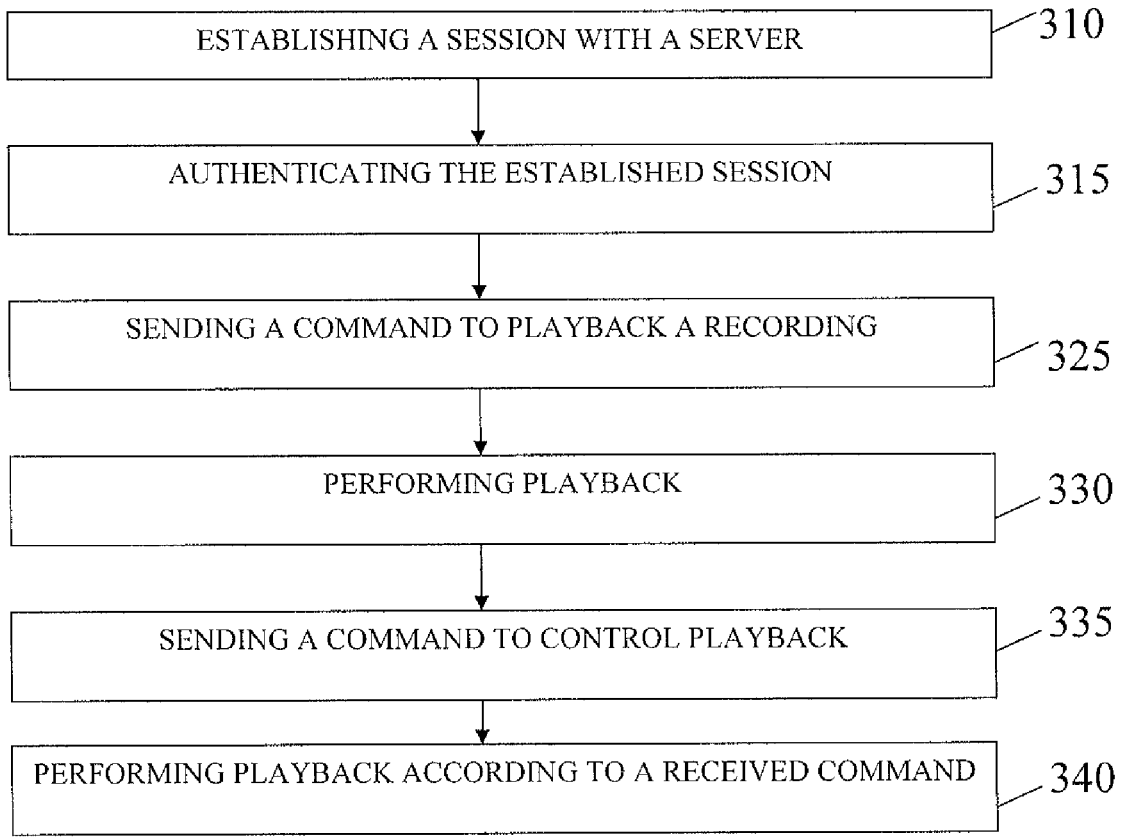
FIG. 3 is an exemplary flowchart describing a method of recording a call according to embodiments of the invention.

Reference is now made to FIG. 3, which shows an exemplary flowchart describing a method of providing a recorded call according to embodiments of the invention. According to embodiments of the invention, a method of performing a playback of a recording may comprise establishing a session with a server and automatically performing, by the server, a playback of a recording. As shown by block 310, the method may include establishing a session with a server. For example, possibly using a speed dial technique described herein, a user may call a predefined number associated with a server, e.g., recording server 135 or database server 125. The server may be configured to detect incoming calls and further establish a call with the calling party, e.g., using a modem as known in the art. According to embodiments of the invention, a user may use any suitable playback device to connect to a server and be provided with a playback of a recorded session. A playback device may be any device capable of performing a playback of audible information. For example, a cellular and/or smartphone equipped with at least a speaker may be used as a playback device.

The playback server may obtain the user's record based on an identification parameter associated with the mobile communication device. For example, using the phone number associated with the device used by the user to establish the session with the recording server, e.g., by examining CID information, an application on the playback server may locate the relevant user's record or profile. Based on information in the user's profile or based on other parameters, the server may locate recorded sessions related to the user, e.g., ones initiated using the specific communication device used for establishing the playback session and may perform a playback of such recorded sessions, as described herein. A playback session may include listing or making available some or all recorded sessions related to a specific user or device. For example, upon establishing a playback session a user may be provided by the playback server with a sorted list of recorded sessions. Such sorting may be based on indices associated with recorded sessions as described herein. A user may select one or more or a range of recorded sessions and the server may perform a playback of selected sessions.

As shown by block 315, the method may include authenticating the established session. In some embodiments, authentication as shown by block 315 may comprise authenticating a communication device, in other embodiments, authentication as shown by block 315 may comprise authenticating a user, in yet other embodiments, authentication as shown by block 315 may comprise authenticating both a user and the device used for establishing a session with the authenticating entity. In some embodiments, a server, e.g., database server 125, may be configured to establish a session, automatically authenticate the established session and, contingent on authenticating the session, and automatically commence a playback of recorded sessions. For example, using the caller identification (CID) feature as known in the art, server 125 may identify the calling device by its phone or subscriber number and may, upon establishment of a call with an identified device, perform a playback of recorded calls associated with, or related to the identified device. For example, a specific mobile phone may be used to record calls as described herein. As described herein, metadata such as the phone or subscriber number of the specific mobile phone may be stored and associated with the stored recorded calls. Accordingly, upon establishing a call with the specific mobile phone as shown by block 310, server 125 may use CID information provided by a carrier to locate some or all calls associated with the specific mobile phone and automatically begin a playback of associated calls. For example, server 125 may be configured to playback all calls associated with a specific device starting with the most recent one and proceeding in a backward chronological order. Such configuration may enable embodiments of the invention to provide a unique security aspect as calls may only be provided to the person who caused the calls' recordings or provided to a trusted person, e.g., one who was permitted to use a specific communication device by the owner or operator of the device.

In other embodiments, a server such as database server 125 may be configured to produce a prompt, e.g., a distinctive beep sound upon establishment of a call with a calling party and/or upon completing any required preparations for performing playback. Such prompt may inform a caller that a password is expected. In other embodiments, a recorded announcement may be played by the server requesting a caller to provide a password. According to embodiments of the invention, a password may be related to a communication device. The password may be designated by the user; it may be randomly assigned; or it may be derived, for example, using a secret formula or algorithm to generate a password based on one or more parameters associated with a relevant communication device. For example, a secret formula may generate a password based on a phone or subscriber number of a telephone device.

A password, possibly generated as described herein, may be provided over a call or session including the related phone, namely, the phone associated the phone number used as input to a password generation method and/or process as described herein. In some embodiments of the invention, as described below, a phone number may be dialed to obtain a password automatically. For example, a user may use his phone to call the password server, which may receive the caller ID, and provide the respective password, e.g., by lookup, or by password generation based on the caller ID. The password server may convert the password to words and play it audibly to the user.

Embodiments of the invention in which passwords are generated as required based on the CID, rather than stored, may have certain advantages. First, no password file exists, accordingly, hackers or other hostile entities may be unable to obtain a password file and, using techniques known in the art (e.g., decrypt an encrypted password file), obtain passwords and jeopardize security and privacy of information stored by the system. Second, a secured method of delivering a password is established as a password is only provided to a user of a specific device, accordingly, no other user or entity may obtain a password thus protected and delivered.

As shown by block 325, the method may include sending a command to playback a selected recording. In some embodiments, search commands may be supported. For example, based on metadata associated with recorded sessions as described herein, searching of specific recordings may be performed. For example, after connecting to a server (e.g., a database server described herein) and using keys on a keypad, a user may indicate a date, e.g., type a DD/MM/YY combination denoting day, month and year. Upon receiving a date specification, a server may list, or commence playback of, recordings that have been performed on the specified date. An indicated date may be used by a server in order to commence playback recordings of calls or communication sessions recorded from the indicated date onwards or backwards in time. In some embodiments, an audible index or comment may be played to a user, and the user may select a recorded session on such basis. It will be recognized that the selection may be voice-activated, for example, using voice recognition technology.

As shown by block 330, the method may include performing playback of recorded sessions. As described herein, such playback may be automatic or it may be performed in response to a command received from a user as described herein. It will be noted that a user may issue commands to a server as described herein at any point after a call or session was established as shown by block 310. For example, while a playback is performed as shown by block 330, a user may issue and/or send commands to the server as shown by block 335. Accordingly, a server performing a playback as described herein may perform a playback or other tasks according to commands received from a user as shown by block 340. Any operations, e.g., as known in the art with relation to recording and playback devices may be performed before, after or during a playback as described herein. Exemplary commands may be fast or skip forward, skip backward or jump to a next or previous recording.

For example, DTMF signaling may be used as described herein. In some embodiments, features such as present in IVR or AVR technologies and as known in the art may be employed. For example, the server may be configured to provide an audible menu or list of options or possible actions and associated keys. For example, a message indicating that the "0" key on the phone's keypad may be used to hear a help message, the "2" and "3" keys may be used to cause a respective ten (10) and sixty (60) seconds fast-forward of a playback, the "4" and "5" keys may be used to cause a respective ten (10) and sixty (60) seconds fast rewind or skip of a playback, the "#" key may cause a replay of the currently playing recording, the "*" key may cause a replay of the previously played recording, the "6" key may be used to skip to the next recording and so on. Any function related to playback as known in the art, e.g., as implemented by tape or electronic recorders, e.g., pause and resume a playback, skip, fast forward or rewind etc. may be implemented or supported by a playback server.

In some embodiments of the invention, the playback controls may be voice-activated, for example, using voice recognition technology. Some mobile communication devices may include built-in voice recognition or speech-to-text software modules, such that the processor of the device may receive a voice signal and convert the voice signal to a corresponding text. A user may store preferences, for example, in a memory associated with the device, including certain voice commands corresponding to desired actions. Thus, for example, a user may store the text "NEXT BOOKMARK" as a command to skip forward to the next bookmark. Similarly, the mobile device may have stored thereon other voice-activated commands and corresponding text, e.g., "STUTTER" to replay on a loop a number of seconds, or "STUTTER 10" to replay on a loop a number the previous 10 seconds, and others, which the application may convert to commands to be performed by the recording server, e.g., via a corresponding DTMF tone.

In some embodiments, a playback of a recorded session may comprise receiving a playback control based on an input received from a communication device and performing a playback based on the playback control. For example, a playback control may cause a playback server to repeat a playback, to perform a stutter playback as further described herein or to a skip forward or backward to a bookmark. For example, feature referred to herein as the "stutter" feature may be implemented. According to embodiments of the invention, pressing a predefined key on a phone's keypad while a playback is being performed may cause a server to continuously repeat playback of a portion of a recording. For example, pressing the "1" key on a phone's keypad while the phone is used to listen to a recording as described herein may cause the server to continuously repeat playback of the most recently played-back ten (10) seconds of the current recording. Such feature may be favorable in certain situations. For example, party A calls party B to receive directions needed in order to reach a location. Before B provides the directions, A includes a recording server in the call as described herein, e.g., by speed dialing server 135 and establishing a conference call including A, B and recording server 135. B provides directions which are recorded by recording server 135. Either A or B terminates the call. A calls server 135 and is provided with a playback of the call. While the playback is in progress, A is driving towards the destination, but needs to coordinate the playback with her location, or is trying to memorize the instructions. Immediately after a portion of the call A is trying to memorize is played, or a portion of the call relevant to A current location is played-back, A presses the "1" key on her phone's keypad to cause the last portion, snippet or segment to be replayed continuously. When A is sure she remembers the portion continuously played-back as described, or the repeated segment is no longer relevant, A presses the "1" key again to cause the playback to continue normally.

It will be recognized that the method flow of FIG. 3 may be performed over any network. For example, according to embodiments of the invention, recorded calls may be provided to a computing device over a computer network. For example, recorded calls may be provided to a computing device over the internet, e.g., by web server 115 shown in FIG. 1. For example, a user may login to a web site hosted on web server 115 and download a file or listen directly to a recording stored on database server 125. For example, web server 115 may communicate with database server 125 to receive a recording and any related data or information, and serve the recording to a user or enable a user to access the recording. According to embodiments of the invention, prior to being provided access to a recording, a user may be authenticated, e.g., by web server 115.

As described herein, recorded calls may be protected, for example, in order to provide security and/or observe privacy. As described herein, protection may be provided by encrypting voice data or other information before storing it and only decrypting encrypted data when providing it to authenticated clients. As described herein, when a user whishes to listen to a recording using the phone or communication device previously used to generate or cause the recording, the user may not be required to provide a password since the system may determine, detect and/or verify the accesses is via the same device used for generating the requested recording, thus it is assumed the access is to be authorized, namely, the user accessing the recording is the same user who participated in the call and possibly caused the recording of the call. For example, metadata stored in association to a stored recording may include the phone number of the phone used to cause, command, or instruct the recording.

However, there may be a need to allow another party not using the original mobile communication device to access a recording. In some embodiments of the invention, therefore, there may be a recordings may be accessed and played back over the internet to a computing device. In such instances, there may be a need for different and/or additional measures. It will be recognized that such measures may be optionally instituted based on the user's preferences, for example, globally, or for particular recorded sessions.

As described herein, in some embodiments of the invention, a password including a predefined number of digits may be generated, for example, based on the combination of randomly generated large numbers, known in the cryptography as "salt", as well as on a set of parameters related to a communication device used by a party to a call to cause a recording of the call, or based solely on a set of parameters related to a communication device used by a party to a call to cause a recording of the call. For example, a six (6) digit password may be generated based on a ten (10) digit phone number, possibly combined with salt generated for that 10 digit phone number, to prevent reverse engineering of the algorithm and malicious use of the database in case of security breach, while allowing secure authentication to the server. Thus, for example, the password may be a general password, as described herein, based on the user's caller identification number, or it may be a password to allow another user limited access to one or more particular sessions without permitting general access.

In order to gain access via a computing device, a password may be required, for example, as described herein. According to embodiments of the invention, a parameter related to or associated with a communication device, e.g., the phone number, may be used together with an associated password, which itself may be generated based on the parameter in order to authenticate access to recorded or other data or information. For example, an authentication procedure may include receiving from a user at least a part of a phone number and a password. For example, in order to be authenticated, a user may be required to provide a ten (10) digit phone number and a six (6) digit password. Embodiments of the invention may verify that a password thus provided matches the phone number provided with it. For example, the phone number may be used to generate a new password using a predefined program, e.g., the program used to generate the password previously provided to the user. The newly generated password may be related, e.g., compared to the password provided by the user. If a match is found, e.g., the password provided by the user is the same as the newly generated password, or other rule or criteria are met, the user may be authenticated and granted access to the requested recordings, listings or other information that may be provided, e.g., by a web site.

For example, upon being provided with the main page of a web site, the user may click on a login button. The user may further enter an account number, which may be his phone number, and password. In some embodiments, a user may be provided with various views related to recorded calls. For example, a table, list, form or other suitable structure or arrangement that may include graphical, multimedia and/or textual objects may be presented. For example, calls may be listed chronologically, or sorted by or according to various parameters or aspects. For example, calls may be sorted according to participating parties, duration, date and time, importance (as marked or designated by the user) etc. According to embodiments of the invention, recorded calls or conversations may be provided according to any applicable or suitable method. For example, a media player may be used to replay or playback a recording, e.g., upon double clicking on a recoding icon, line, link or other object. In some embodiments, recordings may be downloaded to a local computer or device and replayed thereon, e.g., as known in the art. Any applicable means as known in the art may be used to listen to a recording, view a recording in cases were multimedia information and/or data are recorded or otherwise replay a recording. For example, any methods, techniques or means known for providing users with multimedia over the internet may be applicable and implemented according to embodiments of the invention. Additionally or alternatively, any related data may be viewed and/or downloaded. For example, a list or other structure or construct representing recorded calls may be downloaded, for example, as an electronic spread sheet document or file as known in the art. Accordingly, a user may obtain, and possibly print a report related to recorded calls. Any form of report including listings, sorted listings, statistics, indications and the like may be produced and provided, e.g., online in a web page or as downloadable data. It will be recognized that any method, format or means of reporting as known in the art may be implemented by embodiments of the invention without departing from the scope of the invention.

According to some embodiments, some or all calls may be associated with a unique identifying number, e.g., a recorded session identification number (RSID). For example, a twelve (12) digit number may be computed as follows: 2 digits representing a month, 2 digits representing a day, 2 digits representing a year and a six-digit serial number specific to the call or session. Accordingly, an RSID number may uniquely identify the session, for example, if the six-digit serial number is not repeated on the same day, while also indicating the date thereof. A RSID number as described herein may be used in a number of ways for a number of purposes. For example, a RSID number may be used by an authenticated user to enable another user to listen to, or view a recording.

According to embodiments of the invention, an authenticated caller or user or an entity possessing appropriate information or parameters may enable others to be provided with a recording in more than one way. As described herein, one way of sharing a recording or enabling others to be provided with a recording may be to establish a session, e.g., a conference call and then include a server in the session and further causing the server to perform a playback of one or more recordings. According to embodiments of the invention, another method of enabling others to be provided with a recording may be by providing them with a RSID number as described herein. For example, possibly after locating a specific recording, e.g., by listening to, or viewing it, a user may record the associated RSID number (that may be visibly indicate as described herein, e.g., in a list). The user may further provide another person or organization with the relevant RSID number.

According to embodiments of the invention, a playback server may be called, and a call placed by a user to a number associated with the playback server may be answered by the server (e.g., by a modem installed as described). According to embodiments of the invention, an IVR, AVR, or other application as known in the art, may present the caller with various options. One such option may be to provide a RSID number. A RSID number may be provided by pressing the appropriate keys on a phone's keypad. An application on the server may determine if the provided RSID number is a valid parameter, e.g., relates to a recorded session. Possibly contingent on validating the provided RSID number, the relevant call may be provided. For example, an audio and/or video playback may be performed. Accordingly, a RSID number may be used to enable users or callers to be provided with recordings, including recordings of calls or sessions they were not a party to. Any commands or controls described herein may be used while listening to, or otherwise being provided with a recording as described herein. For example, a replay or playback of a call provided to a person by providing a RSID number may be paused, fast-forwarded, skipped backwards or caused to stutter as described herein.

An exemplary registration process is described which may utilize dual communications channels of a mobile communication device. Upon obtaining the application on the mobile communication device, e.g., upon purchasing and/or downloading the application, registration with the call-recording service may be required.

Figure 4:
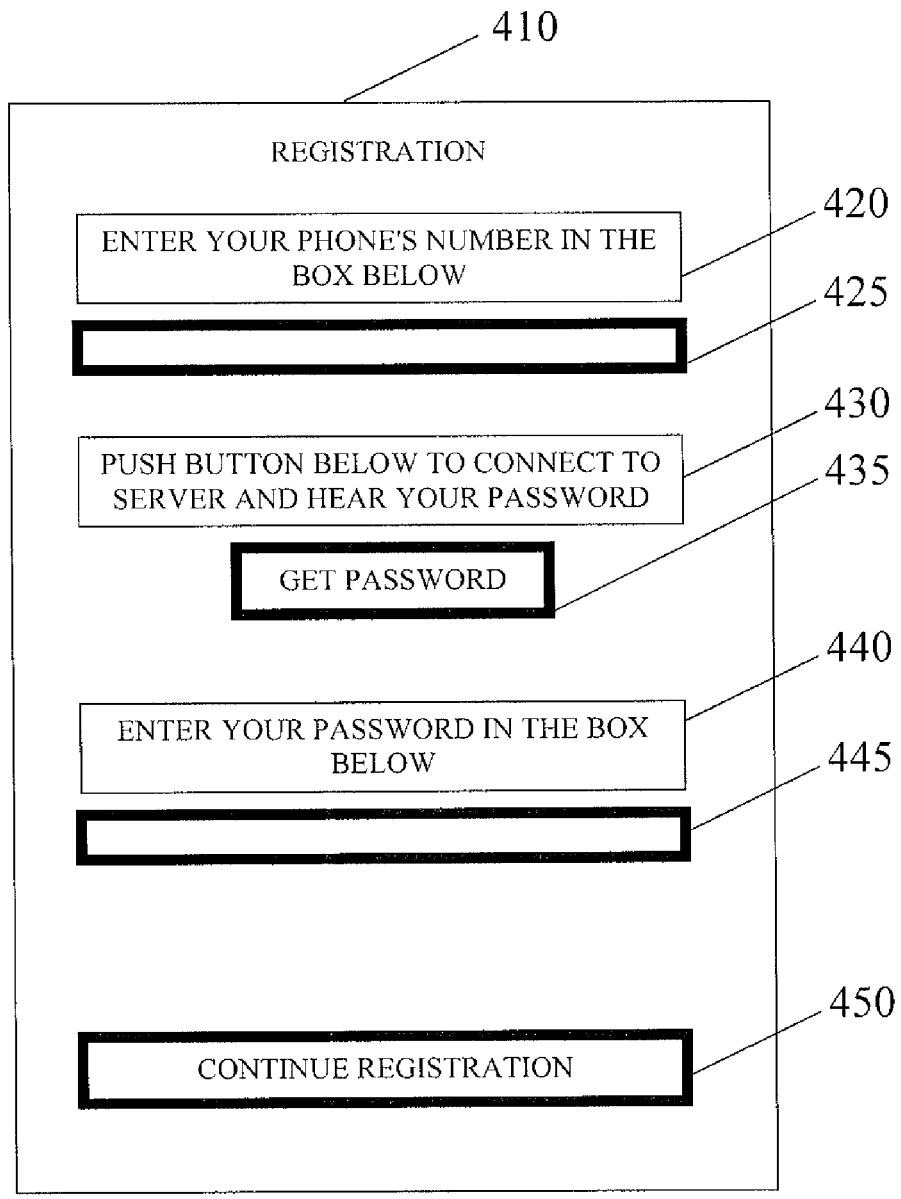
FIG. 4 shows an exemplary screenshot according to embodiments of the invention.

Reference is made to FIG. 4, which shows an exemplary screenshot of a registration screen 410 according to embodiments of the invention. For example, a program or application executed on a mobile communication device may cause screen 410 to be displayed, and may receive inputs related to screen 410, e.g., text entered, a soft button on the screen being pressed, etc. A user may be prompted (420) to enter a phone number into a text entry box (425). The phone number may be stored in a suitable location of local memory of the mobile communication device. The user may be prompted (430) to push button 435 to obtain the password. Upon pushing button 435, the device may initiate a phone connection to a password server using a pre-programmed or pre-stored access telephone number. The password server may obtain the user's phone number from the caller ID, and generate the password, in any method described herein, and play the password audibly to the user over the phone connection. A password sent from the server to the communication device may be in the form of audible data. For example, text to speech technology as known in the art may be used, e.g., by the password server, to convert or transform a password string to audible information, e.g., the numbers, characters or letters comprising the password may be spoken in human voice. It will be recognized that in other embodiments of the invention, a different phone channel may be used, for example, pushing button 435 may produce an SMS message to the password server, which may recognized the CID of the phone, and respond with an SMS message including the password. The user may be prompted (440) to enter the password in text entry box 445. The password may be stored in a suitable location of local memory of the mobile communication device. The user may continue registration by pushing button 450, at which time the application may confirm that a valid phone number, e.g., having the requisite number of digits, has been stored in memory, and a valid password, e.g., having the requisite number of digits and/or another validation algorithm. It will be recognized that in some embodiments of the invention, the application may not have stored thereon a means of determining whether the stored phone number is indeed the user's phone number associated with the device, and whether the stored password is the correct password for the phone or phone number. However, in some embodiments of the invention, upon completion of registration, the mobile communication device may initiate a wireless data connection to a data server, e.g., to a web server via a TCP connection, and may communicate the phone number and password, and the web server may verify that the stored password is correctly associated with the stored phone number, and may communicate the verification to the mobile communication device. Such connection may be secured, e.g., according to a secured socket layer (SSL) protocol. The stored phone number and/or password may be used upon initiating the application for use, as described below. Upon failure of verification, an error message may be generated and registration denied. Upon successful verification, registration may be completed, and the application may be loaded for use.

According to embodiments of the invention, parameters or other information or data, such as access phone numbers, may be dynamically associated with interface objects or functions on a communication device. For example, graphical user interface (GUI) objects such as buttons, their associated call functions, or other objects and associated functions may be dynamically and/or automatically associated with parameters. For example, access numbers for a recording, playback, or password server may be automatically and/or dynamically associated with an application, a function or a GUI object on a communication device such that, for example, when the session recording application is loaded, the access numbers are updated.

Figure 5:
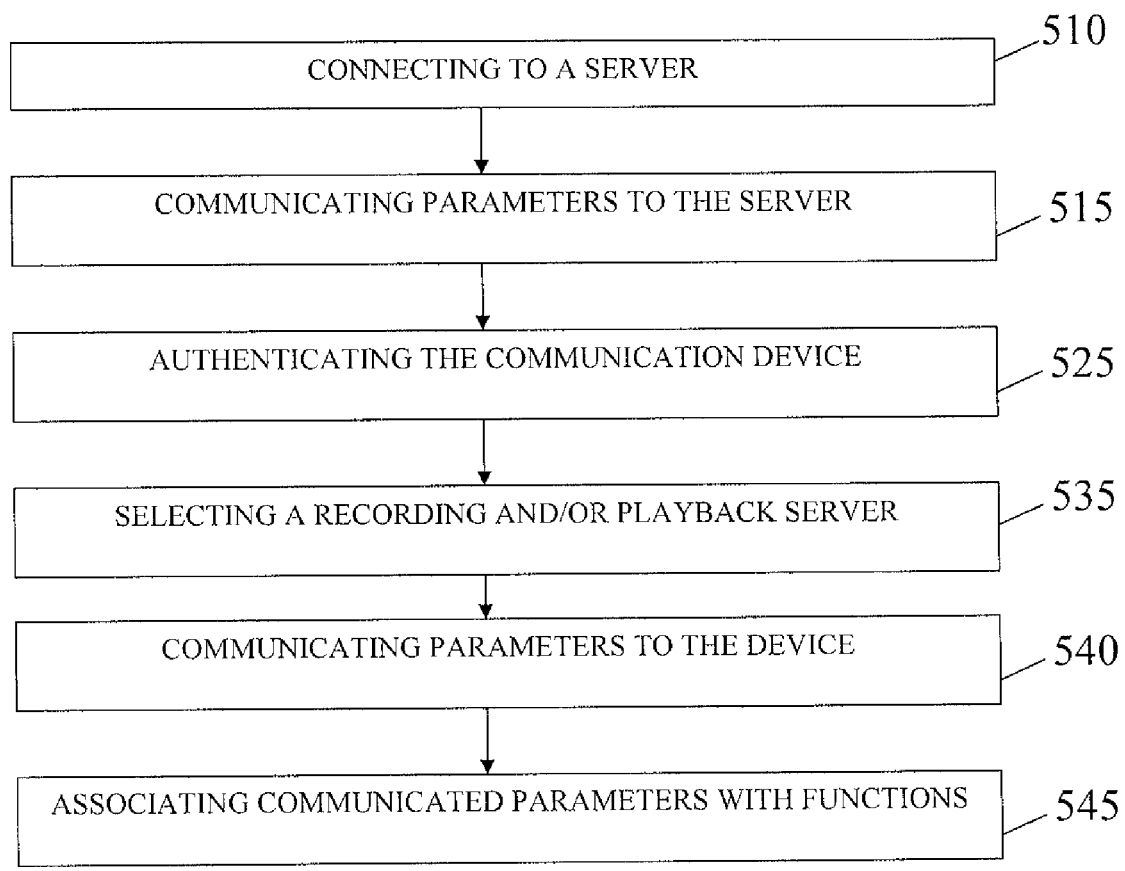
FIG. 5 is an exemplary flowchart describing a method of dynamically associating parameters with functions according to embodiments of the invention.

Reference is made to FIG. 5, which shows an exemplary flowchart describing a method of dynamically associating parameters with functions or objects according to embodiments of the invention, and to FIG. 6, which shows an exemplary screenshot 610 according to embodiments of the invention.

As shown by block 510, the method may include connecting to a data or web server. For example, an application on a communication device may, e.g., upon the device being switched on or upon loading the application, automatically connect to a predefined data or web server referred to herein as a "selection server". For example, such connection may be to a server on the internet according to a predefined domain name or address, an internet protocol (IP) address or any suitable parameter. Connecting to a selection server may comprise establishing a TCP connection, exchanging user datagram protocol (UDP) packets or establishing any suitable connection or session between the communication device and the selection server. Although in some embodiments, connection to a selection server may be performed as described herein, e.g., automatically upon startup of the device or application, in other embodiments, connection may be established when needed.

As shown by FIG. 6, a "RECORD" button 620, "PLAYBACK" button 630, and "GET PASSWORD" button 640, may be rendered on a display screen of the mobile communication device. For example, the application executed by the device processor may render screen 610 and shown GUI objects. Such application may further establish a connection with a selection server as shown by block 510 only upon detecting that one of buttons 620, 630, or 640 was pressed. Accordingly, a connection with a selection server as shown in block 510 may be established upon detecting a need for a service or function, e.g., upon detecting a user whishes to perform or commence a recording, a playback or get a password as described herein. It will be recognized that functions shown in FIG. 6 are exemplary functions and that any function, service or operation may be enabled as shown and accordingly, the method described herein with respect to FIG. 5 may be applicable to any applicable function or service.

As shown by block 515, the method may include communicating parameters to the selection server. For example, a phone number of the device (e.g., locally stored as described herein), a stored password, and/or any other relevant parameters or data, e.g., an expiration date, a cell id, etc., may be communicated to the selection server by the application that established the connection.

As shown by block 525, the method may include authenticating the communication device. Although authenticating the communication device may be skipped, such authentication may be performed, e.g., in order to verify the user and/or device is indeed registered for one or more services provided by the system. The device may be identified based on the stored phone number and the accompanying password. The selection server may verify, for example, that the phone number is registered, that the password matches the phone number, and that the registration for service is in date. Upon successful verification, the selection server may communicate a verification to the mobile communication device.

As shown by block 535, the method may include selecting, by the selection server, any or all of a recording, playback, and/or password server. It will be realized that selecting a recording or playback server as describe herein are merely exemplary selections that may be made according to embodiments of the invention. Any parameters, functions, arguments or associations may be selected and/or made as described herein. Selecting a recording or playback server may be according to any applicable parameters, conditions or context. For example, a recording server may be selected based on load-balancing considerations, e.g., a least loaded server may be selected. Other considerations for selecting a recording or playback server may be the geographical location of the communication device, e.g., a recording server that geographically close to the communication device or the selection may be according to services that a selected server is capable of providing. In order to select a recording or playback server, the selection server may obtain or posses any required information. For example, the selection server may be in communication with a number of recording servers, playback serves, selection servers or with any other servers such that any information that may be needed in order to perform a selection as described herein is available to the selection server making the selection.

As shown by block 540, upon selection of the playback, recording and/or password server, relevant parameters of the selected servers may be communicated to the mobile communication device. For example, an access phone number of the selected servers may be communicated to the communication device.

As shown by block 545, the method may include associating communicated parameters with functions. Parameters provided as described herein may be associated with functions and/or GUI buttons. For example, a phone number of a recording server provided as shown by block 540 may be associated, e.g., by the receiving application, with "RECORD" button 620 shown in FIG. 6. Thus, upon pressing the "RECORD" button, the selected access phone number for the recording server is dialed. Likewise, an access phone number of a playback server may be associated with "PLAYBACK" button 630 in FIG. 6 or with an application called by this button. Likewise, an access phone number of a password server may be associated with the "GET PASSWORD" button 640 or with a related application or a GUI callback function. Accordingly, a record button displayed to a user may cause a first recording server to perform a first recording and may, without the user being aware of such change, cause a second recording server to perform a second recording, e.g., at a later time or date. Such dynamic association may enable embodiments of the invention a level of flexibility, scalability and resilience otherwise impossible. For example, upon detecting a specific recording server is non operational, embodiments of the invention may dynamically direct recording tasks to alternative recording servers by dynamic association as described herein.

Figure 7:
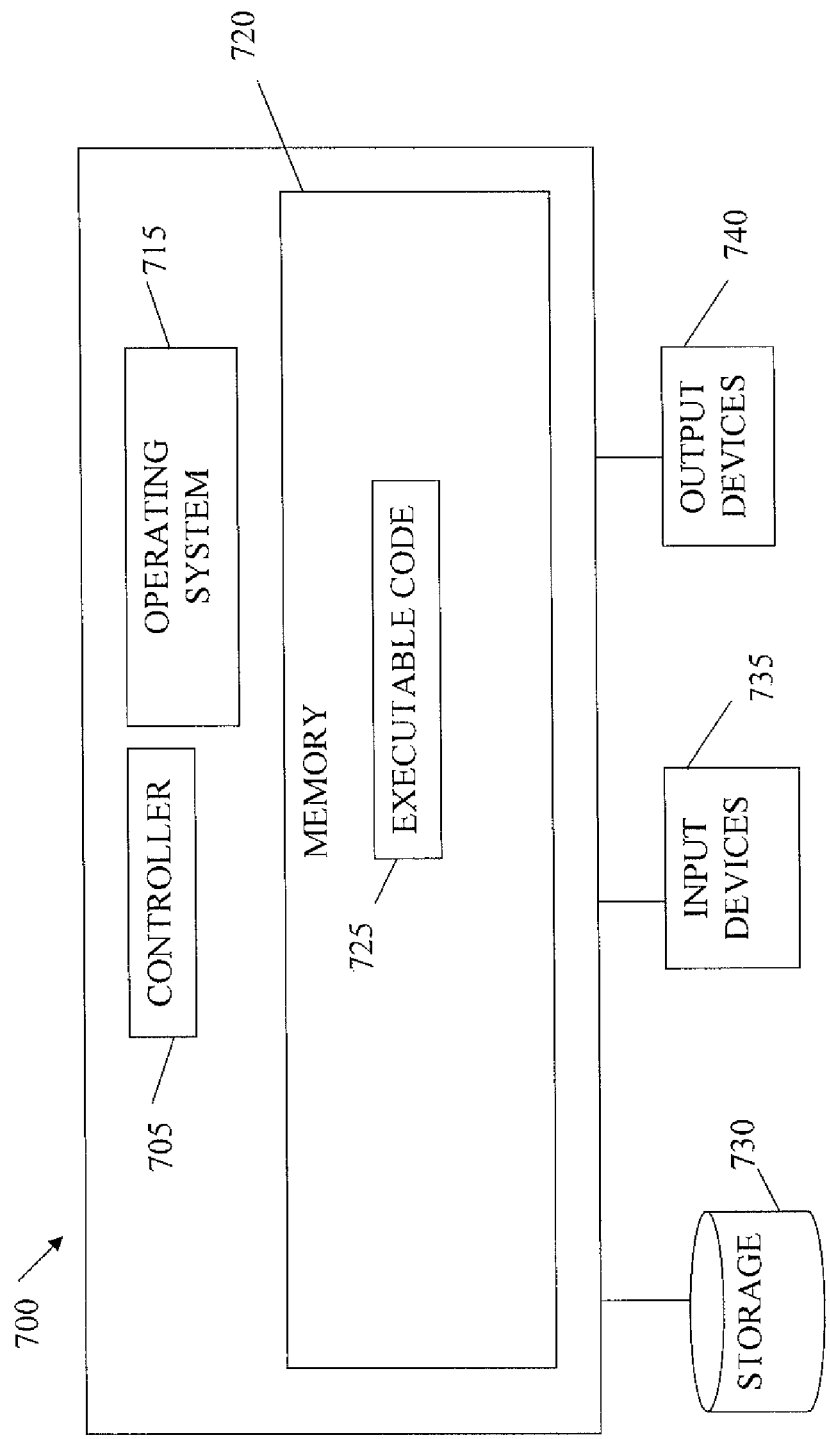
FIG. 7 shows a high level block diagram of an exemplary computing device according to embodiments of the present invention.

Reference is made to FIG. 7, which shows a high level block diagram of an exemplary computing device according to embodiments of the present invention. Computing device 700 may include a controller 705 that may be, for example, a central processing unit processor (CPU), a chip or any suitable computing or computational device, an operating system 715, a memory 720, a storage 730, an input device 735 and an output device 740.

Operating system may be or may include any code segment designed and/or configured to perform tasks involving coordination, scheduling, arbitration, supervising, controlling or otherwise managing operation of computing device 700, for example, scheduling execution of programs. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by controller 705 possibly under control of operating system 715. For example, executable code 725 may comprise parts of recording management unit 145. Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a network interface card (NIC), a printer or facsimile machine, a universal serial bus (USB) device or external hard drive may be included in input devices 735 and/or output devices 740. According to embodiments of the invention, recording server 135, database server 125, web server 115, wireless communication devices 110A-C and wired communication devices 111A-C may comprise all or some of the components comprised in computing device 700 as shown and described herein.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein. For example, a storage medium such as memory 720, computer-executable instructions such as executable code 725 and a controller such as controller 705. For example, executable code 725 may comprise computer-executable instructions that may be executed by a controller such controller 705 installed in server 135.

Some embodiments may be provided in a computer program product that may include a machine-readable medium, stored thereon instructions, which may be used to program a computer, or other programmable devices, to perform methods as disclosed above. Embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of recording a call comprising:
    establishing a first cellular communication session between a mobile cellular communication device and a remote recording server over a telephone network;
    obtaining a user record at the remote recording server based on an identification number associated with the mobile cellular communication device;
    establishing a second cellular communication session between the mobile cellular communication device and a first party;
    joining by the mobile cellular communication device the first and second cellular communication sessions, thereby rendering said remote recording server a party to the second cellular communication session;
    recording said second cellular communication session; and
    storing said recorded second cellular communication session by the remote recording server in association with said user record.

2. The method of claim 1, wherein said user record is associated with at least one user preference, and wherein said recording is in accordance with said at least one user preference.

3. The method of claim 2, wherein said user preference is selected from the group consisting of: a payment preference, a recording quality, a keypad control key for commencing recording, a keypad control key for pausing recording, and an audible indication during recording of the second cellular communication session.

4. The method of claim 1, further comprising:
    receiving a control command from a user using the mobile cellular communication device; and
    recording said second cellular communication session in accordance with said received control command.

5. The method of claim 4, wherein said control commands are selected from the group consisting of: commence recording, pause recording, insert a bookmark, and index the second cellular communication session.

6. The method of claim 4, wherein said control command is received using an input keypad associated with said mobile cellular communication device.

7. The method of claim 4, wherein said control command is received using a voice command by the user, wherein said mobile cellular communication device is configured to identify the voice command and communicate a command to said remote recording server to record said second cellular communication session in accordance with said received control command.

8. The method of claim 1, wherein the first cellular communication session between the mobile cellular communication device and the remote recording server is established by the mobile cellular communication device conditional upon the first party being included on an automatic call record list stored in a non-transitory memory of the mobile cellular communication device.

9. The method of claim 1, wherein storing said recorded second cellular communication session comprises storing said recorded second cellular communication session in association with an index parameter.

10. The method of claim 9, wherein said index parameter is selected from the group consisting of: a date, a time, a first party, a recording duration, and an audible comment recorded by said user.

11. The method of claim 1, further comprising the following steps after storing said recorded second cellular communication session:
    establishing a playback session between a listener using a playback device and a playback server;
    verifying authorization of the listener to access one or more recorded sessions; and
    playing back an authorized one or more recorded sessions.

12. The method of claim 11, wherein storing said recorded second cellular communication session comprises storing said recorded second cellular communication session in association with an index parameter, and further comprising the following steps after establishing the playback session and obtaining the user record:
    providing the listener with a plurality of recorded sessions based on said indexing parameter;
    receiving a selection of a recorded session for playback based on an input received from said listener; and
    playing back the selected recorded session.

13. The method of claim 11, further comprising the following steps during playing back of the recorded session:
    receiving a playback control based on an input received from said playback device; and
    playing back the selected recorded session based on said playback control.

14. The method of claim 13, wherein said input is provided by a keyboard associated with said playback device.

15. The method of claim 13, wherein said input is a voice command by the listener, wherein said playback device is configured to identify the voice command and communicate a playback control to said playback server to play back the selected recorded session based on said playback control.

16. The method of claim 13, wherein said playback control is selected from the group consisting of: a repeat feature, a stutter feature, a skip to a next recorded session, a skip to a previous recorded session, a skip forward, a skip backward, and a skip to bookmark feature.

17. The method of claim 11, wherein said playback device is a general-purpose computing device distinct from the mobile cellular communication device, and wherein said playback session is established over a data network.

18. The method of claim 17, wherein verifying authorization of the listener to access said playback session comprises:
    receiving a recorded session identification number associated with the recorded session;

receiving a session password from said computing device; and verifying authorization if said session password matches said received recorded session identification number associated with the recorded session.

19. The method of claim 11, wherein said playback device is a mobile communication device, and wherein said playback session is established over a cellular telephone network.

20. The method of claim 19, wherein verifying authorization of the listener to access said playback session comprises:
obtaining the identification number associated with the mobile cellular communication device;
receiving a password from said mobile cellular communication device; and
verifying authorization if said password matches said obtained identification number associated with the mobile cellular communication device.

21. The method of claim 1, further comprising:
performing a registration process, wherein said registration process comprises:
receiving via an input keypad associated with said mobile cellular communication device an identification number of said mobile cellular communication device;
storing said identification number in a memory associated with said mobile cellular communication device;
establishing a cellular communication session between the mobile cellular communication device and a password server over a cellular telephone communication network;
receiving from said password server over said cellular telephone communication network a password;
storing said password in a memory associated with said mobile cellular communication device; and
communicating said stored identification number and said stored password from said mobile cellular communication device to a registration server over a data network.

22. The method of claim 21, wherein said registration process further comprises:
obtaining at said password server a caller ID (CID) number associated with the mobile cellular communication device; and
sending to said mobile cellular communication device a password based on said CID number.

23. The method of claim 1, wherein establishing a wireless communication session between a mobile communication device and a recording server comprises:
establishing a wireless communication session between the mobile communication device and a selection server over a data communication network;
sending a stored identification number and a stored password from said wireless communication device to said selection server;
receiving from said selection server an access telephone number of said recording server over said data communication network; and
establishing said cellular communication session between a mobile cellular communication device and said recording server over a cellular telephone network.

24. The method of claim 1, wherein said mobile cellular communication device has a set of instructions stored thereon, wherein said instructions when executed cause the mobile cellular communication device to establish the first cellular communication session between the mobile cellular communication device and the remote recording server over a telephone network.

25. The method of claim 24, wherein said mobile cellular communication device further comprises a memory having stored therein an access number of the remote recording server, and wherein said set of instructions when executed cause the mobile cellular communication device to establish the first cellular communication session between the mobile cellular communication device and the remote recording server over a telephone network using the stored access number.

26. The method of claim 24, wherein said set of instructions when executed cause the mobile cellular communication device to join the first and second cellular communication sessions.

27. The method of claim 1, further comprising performing a registration process, wherein said registration process comprises:
establishing a cellular communication session between the mobile cellular communication device and a password server over a cellular telephone communication network; and
audibly receiving a password from said password server over said cellular telephone communication network.

28. The method of claim 27, wherein said password is based at least in part on a caller ID (CID) number of the mobile cellular communication device.

29. The method of claim 28, wherein said password server does not store a password file containing said password.

30. The method of claim 27, wherein said mobile cellular wireless communication device comprises a memory having stored therein an access number of the password server, and wherein said mobile cellular wireless communication device has a set of instructions stored thereon, wherein said instructions when executed cause the mobile cellular communication device to establish the cellular communication session with the password server over a telephone network using the stored access number.

* * * * *